United States Patent
Yoshida et al.

(10) Patent No.: US 9,627,737 B2
(45) Date of Patent: Apr. 18, 2017

(54) HIGH-FREQUENCY TRANSMISSION LINE, ANTENNA AND ELECTRONIC CIRCUIT BOARD

(71) Applicant: TDK CORPORATION, Tokyo (JP)

(72) Inventors: Makoto Yoshida, Tokyo (JP); Kenichi Yoshida, Tokyo (JP); Tohru Inoue, Tokyo (JP); Takaaki Domon, Tokyo (JP); Takashi Ota, Tokyo (JP); Katsunori Osanai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 5 days.

(21) Appl. No.: 14/750,528

(22) Filed: Jun. 25, 2015

(65) Prior Publication Data
US 2015/0380796 A1    Dec. 31, 2015

(30) Foreign Application Priority Data

Jun. 27, 2014  (JP) .................................. 2014-132974

(51) Int. Cl.
| | |
|---|---|
| *H01P 3/10* | (2006.01) |
| *H01P 3/12* | (2006.01) |
| *H01P 9/00* | (2006.01) |
| *B82Y 30/00* | (2011.01) |
| *H01Q 1/36* | (2006.01) |
| *H01Q 1/38* | (2006.01) |
| *H01Q 1/40* | (2006.01) |
| *B82Y 99/00* | (2011.01) |

(52) U.S. Cl.
CPC ................. *H01P 3/10* (2013.01); *B82Y 30/00* (2013.01); *H01P 3/122* (2013.01); *H01P 9/006* (2013.01); *H01Q 1/368* (2013.01); *H01Q 1/38* (2013.01); *H01Q 1/40* (2013.01); *B82Y 99/00* (2013.01); *Y10S 977/742* (2013.01)

(58) Field of Classification Search
CPC . H01Q 1/38; H01Q 1/40; H01Q 1/368; H01P 3/10; H01P 3/122; B82Y 99/00
USPC .................... 343/700 MS; 333/239; 977/742
See application file for complete search history.

(56) References Cited

U.S. PATENT DOCUMENTS

| | | | |
|---|---|---|---|
| 7,518,247 B2* | 4/2009 | Sakamoto .............. | B82Y 10/00 257/758 |
| 8,248,313 B2* | 8/2012 | Marcher ................ | H01Q 1/242 343/700 MS |

(Continued)

FOREIGN PATENT DOCUMENTS

| | | |
|---|---|---|
| JP | 2004-111254 A | 4/2004 |
| JP | 2004-156074 A | 6/2004 |

(Continued)

OTHER PUBLICATIONS

Nov. 25, 2015 Extended Search Report issued in European Patent Application No. 15173653.5.

*Primary Examiner* — Lam T Mai
(74) *Attorney, Agent, or Firm* — Oliff PLC (57) ABSTRACT

A high-frequency transmission line in which the alternating-current resistance is low is provided. A high-frequency transmission line 2 is a high-frequency transmission line 2 to transmit an alternating-current electric signal, and contains metal and carbon nanotube, and the carbon nanotube is unevenly distributed at a peripheral part 8 of a cross-section that is of the high-frequency transmission line 2 and that is perpendicular to a transmission direction of the alternating-current electric signal.

3 Claims, 5 Drawing Sheets

(56) References Cited

U.S. PATENT DOCUMENTS

| | | | |
|---|---|---|---|
| 8,338,822 B2 * | 12/2012 | Sato | H01L 21/76843 257/40 |
| 8,414,859 B2 * | 4/2013 | Feng | B82Y 30/00 423/447.1 |
| 8,895,651 B2 * | 11/2014 | Hermes | C25D 5/02 524/356 |
| 2006/0091557 A1 | 5/2006 | Sakamoto et al. | |
| 2006/0099438 A1 | 5/2006 | Arai et al. | |
| 2006/0286851 A1 | 12/2006 | Sato | |
| 2009/0114425 A1 | 5/2009 | Lee et al. | |
| 2009/0181535 A1 | 7/2009 | Sakamoto et al. | |
| 2011/0063173 A1 | 3/2011 | Marcher et al. | |
| 2011/0142744 A1 | 6/2011 | Feng et al. | |
| 2013/0257682 A1 * | 10/2013 | Yoshida | H01P 3/08 343/905 |
| 2015/0380796 A1 * | 12/2015 | Yoshida | B82Y 30/00 343/700 MS |

FOREIGN PATENT DOCUMENTS

| | | |
|---|---|---|
| JP | 2006-339552 A | 12/2006 |
| JP | 2008-293821 A | 12/2008 |
| KR | 2014-0024561 A | 3/2014 |
| WO | 2004/051726 A1 | 6/2004 |
| WO | 2010/090055 A1 | 8/2010 |
| WO | 2011/062072 A1 | 5/2011 |

* cited by examiner

HIGH-FREQUENCY TRANSMISSION LINE, ANTENNA AND ELECTRONIC CIRCUIT BOARD

TECHNICAL FIELD

The present invention relates to a high-frequency transmission line, an antenna and an electronic circuit board.

BACKGROUND

In electronic components, transmission lines for the transmission of electric signals are provided. In the recent advanced information age, the frequency band of an alternating-current electric signal that the transmission line transmits has shifted to a high frequency band. For example, the communication frequency band for a portable information terminal ranges from several hundred [MHz] to several [GHz]. In such a high-frequency transmission line to transmit an alternating-current electric signal in a high frequency band, it is required to raise the electric conductivity and to reduce the transmission loss.

In Patent Literature 1, it is disclosed that carbon nanotubes form a network within a conductor pattern and thereby the electric conductivity of the conductor pattern improve.

[Patent Literature 1] International Publication No. WO2011/062072 pamphlet

SUMMARY

However, the inventors discovered that the alternating-current resistance of the conductor pattern is not sufficiently low in the case where the conductor pattern disclosed in Patent Literature 1 transmits the alternating-current electric signal in the high frequency band.

The present invention has been made in view of the above circumstances, and has an object to provide a high-frequency transmission line in which the alternating-current resistance is low, and an antenna and an electronic circuit board that comprise the high-frequency transmission line.

A high-frequency transmission line according to one aspect of the present invention is a high-frequency transmission line to transmit an alternating-current electric signal, the high-frequency transmission line containing metal and carbon nanotube, the carbon nanotube being unevenly distributed at a peripheral part of a cross-section of the high-frequency transmission line, the cross-section being perpendicular to a transmission direction of the alternating-current electric signal.

In a high-frequency transmission line according to one aspect of the present invention, a content rate of the carbon nanotube at the peripheral part may be 0.5 to 20% by volume.

An antenna according to one aspect of the present invention comprises the high-frequency transmission line according to the above one aspect of the present invention.

An electronic circuit board according to one aspect of the present invention comprises the high-frequency transmission line according to the above one aspect of the present invention.

According to the present invention, a high-frequency transmission line in which the alternating-current resistance is low, and an antenna and an electronic circuit board that comprise the high-frequency transmission line are provided.

DETAILED DESCRIPTION

Hereinafter, a preferable embodiment of the present invention will be described, in some cases, with reference to the drawings. However, the present invention is not limited to the following embodiment at all. Here, in the drawings, to identical or equivalent constituent elements, an identical reference character is assigned.

Figure 1:
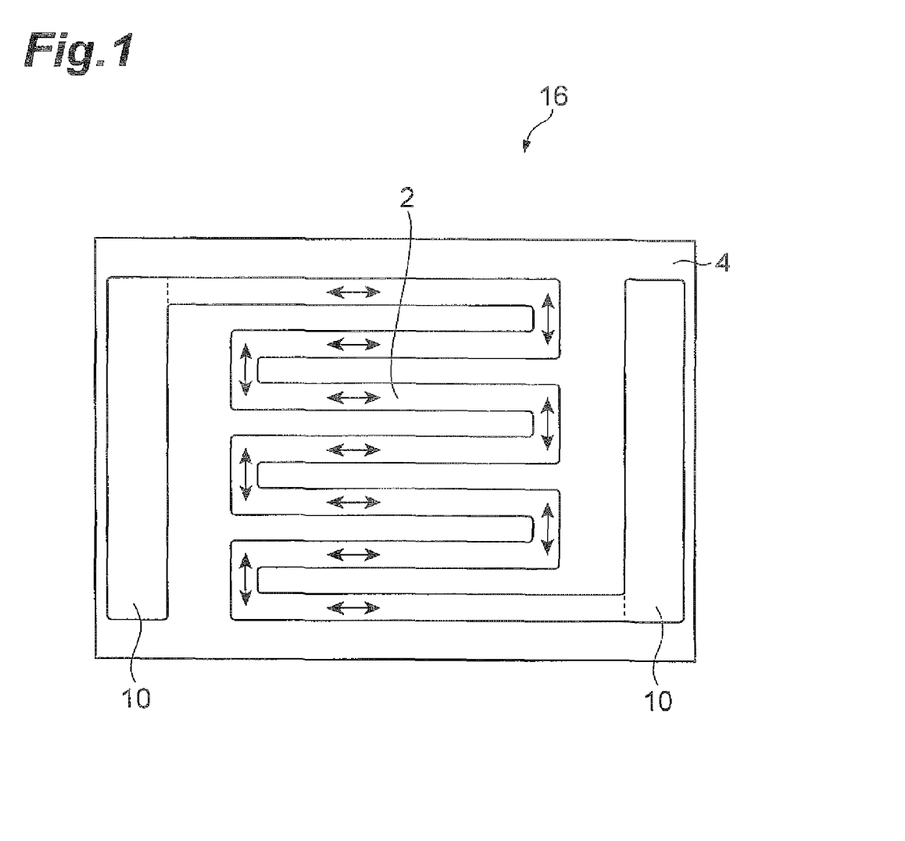
FIG. 1 is a schematic view of a part of an electronic circuit board according to an embodiment of the present invention, and a high-frequency transmission line.

As shown in FIG. 1, an electronic circuit board 16 according to the embodiment comprises a high-frequency transmission line 2 and a substrate 4. The high-frequency transmission line 2 is provided along a surface of the substrate 4. The high-frequency transmission line 2 transmits an alternating-current electric signal. The linear arrows shown in FIG. 1 are oriented in the transmission direction of the alternating-current electric signal. The frequency F of the alternating-current electric signal may be, for example, 100 [MHz] to 3.0 [GHz]. With both ends of the high-frequency transmission line 2, terminals 10 are electrically connected, respectively. The shape of the high-frequency transmission line 2 has a meander pattern. The high-frequency transmission line 2 may be an antenna (a radiation conductor or an absorption conductor). In the case where the high-frequency transmission line 2 is an antenna, the terminal 10 for power feeding may be electrically connected with one end of the high-frequency transmission line 2, a high-frequency power feeding circuit (not illustrated) may be electrically connected with the terminal 10 for power feeding, and the high-frequency power feeding circuit may be earthed. Here, the shape of the high-frequency transmission line 2 is not limited to the meander pattern. The high-frequency transmission line 2, for example, may have a linear shape, or may have a curved shape.

The thickness of the whole of the high-frequency transmission line 2 is not particularly limited, and for example, may be about 3 to 50 μm. The thickness of the whole of the high-frequency transmission line 2 is the width of the whole of the high-frequency transmission line 2 in the direction perpendicular to the surface of the substrate 4. The width of the whole of the high-frequency transmission line 2 in the direction parallel to the surface of the substrate 4 is not particularly limited, and for example, may be about 10 μM to 30 mm. The line length of the high-frequency transmission line 2 is not particularly limited, and for example, may be about 0.1 to 100 mm.

The high-frequency transmission line 2 contains metal and carbon nanotube. However, the high-frequency transmission line 2 may contain other chemical elements besides metal and carbon.

The metal contained in the high-frequency transmission line 2 may be, for example, at least one member selected from the group consisting of copper, aluminum, silver, gold, platinum, palladium, chromium, titanium and tantalum. The metal contained in the high-frequency transmission line 2 may be an alloy that contains two or more members of the above metals. Among the above metals, copper, relatively, has a high electric conductivity and is inexpensive.

The carbon nanotube contained in the high-frequency transmission line 2 is not particularly limited. The carbon nanotube is configured, for example, from a cylindrically-closed seamless graphene sheet. The carbon nanotube, based on the number of the layers (graphene sheets) configuring this, is classified into a single-wall carbon nanotube (SW-CNT) with a one-layer structure, a double-wall carbon nanotube (DWCNT) with a two-layer structure, and a multi-wall carbon nanotube (MWCNT) with a structure configured by three or more layers. In other words, the MWCNT has a structure in which a plurality of cylindrically-closed graphene sheets are laminated in a nested manner. The carbon nanotube may be at least one member selected from the group consisting of the SWCNT, the DWCNT and the MWCNT. The carbon nanotube may have a linear shape. The carbon nanotube may be bent. At the bending part of the carbon nanotube or the closing part of the cross-section of the carbon nanotube, a ring (for example, a five-membered ring or a seven-membered ring) that is configured by carbon and that is other than a six-membered ring may be present. The carbon nanotube may be chemically modified, and the carbon nanotube may have a functional group. The carbon nanotube is produced by a chemical vapor deposition method, a catalyitic vapor deposition method, an arc discharge method or a laser vaporization method, for example.

The diameter (thickness) of the carbon nanotube may be, for example, 1 to 50 nm. The length of the carbon nanotube may be, for example, 100 to 250000 nm. The aspect ratio of the carbon nanotube may be, for example, 100 to 5000. The aspect ratio is the value resulting from dividing the length (nm) of the carbon nanotube by the diameter (nm) of the carbon nanotube.

Figure 2A:
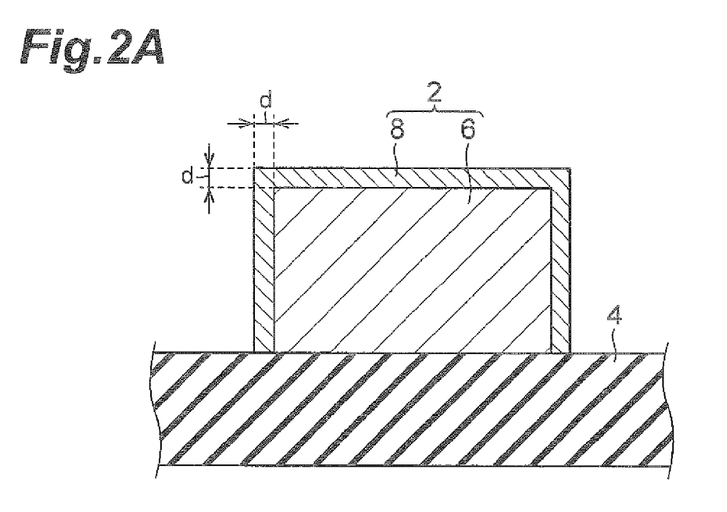
FIG. 2A and FIG. 2B are schematic cross-section views of the high-frequency transmission line in FIG. 1, in the direction perpendicular to the transmission direction of an alternating-current electric signal.
Figure 2B:
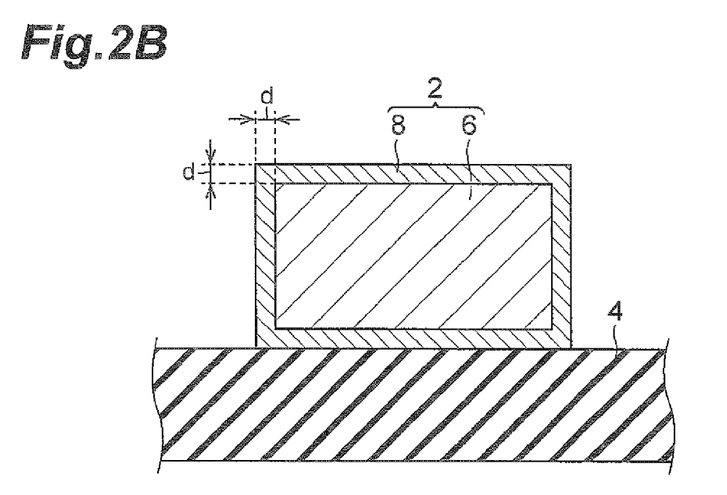

As shown in FIG. 2A and FIG. 2B, the cross-section of the high-frequency transmission line 2 in the direction perpendicular to the transmission direction of the alternating-current electric signal has a peripheral part 8 and a central part 6. In other words, the perpendicular line (normal line) to the cross-section having the peripheral part 8 and the central part 6 is parallel to the transmission direction of the alternating-current electric signal. The peripheral part 8, which is a part of the high-frequency transmission line 2, is a part where the distance (depth) from the surface of the high-frequency transmission line 2 is 0.5 μm or less. The central part 6, which is a part of the high-frequency transmission line 2, is a part that is surrounded by the peripheral part 8. As shown in FIG. 2A, the central part 6 does not need to be completely surrounded by the peripheral part 8. The part where the central part 6 is not surrounded by the peripheral part 8 does not need to be on the bottom surface side as shown in FIG. 2A, and for example, may be on a lateral surface side, or may be on the top surface side. As shown in FIG. 2B, the central part 6 may be completely surrounded by the peripheral part 8. Here, the peripheral part 8 continuously extends in the transmission direction of the alternating-current electric signal, and the central part 6 surrounded by the peripheral part 8 also continuously extends in the transmission direction of the alternating-current electric signal.

At the peripheral part 8, many carbon nanotubes are unevenly distributed. That is, many carbon nanotubes are unevenly distributed at the peripheral part 8 that continuously extends in the transmission direction of the alternating-current electric signal. Some or all of the carbon nanotubes may be exposed on the outer surface of the peripheral part 8. The carbon nanotubes may be unevenly distributed at the outer surface side of the peripheral part 8. The carbon nanotubes may evenly disperse within the peripheral part 8, so as to cover the central part 6.

In the high-frequency transmission line 2 that transmits the alternating-current electric signal in a high-frequency band, the skin effect occurs. In the skin effect, when the high-frequency electric signal (electric current) flows through the high-frequency transmission line 2, the current density becomes high at the vicinity of the surface of the high-frequency transmission line 2, and becomes low with distance from the surface. Here, the vicinity of the surface of the high-frequency transmission line 2 is, for example, a region where the distance (depth) from the surface of the high-frequency transmission line 2 is 5 μm or less, 2 μm or less, or 1 μm or less. That is, the vicinity of the surface of the high-frequency transmission line 2 is a part where the electric current concentrates by the skin effect. Then, the higher the frequency of the alternating-current electric signal is, the more easily the electric current concentrates at the vicinity of the surface of the high-frequency transmission line 2. Therefore, the higher the frequency of the alternating-current electric signal is, the higher the alternating-current resistance of the high-frequency transmission line 2 is. For these reasons, in order to reduce the alternating-current resistance of the high-frequency transmission line 2, it is necessary to raise the electric conductivity at the vicinity of the surface of the high-frequency transmission line 2.

However, if the high-frequency transmission line 2 is composed of only the above metal, the metal located at the vicinity of the surface of the high-frequency transmission line 2 is oxidized by the oxygen in the air, etc., the electric conductivity at the vicinity of the surface of the high-frequency transmission line 2 decreases, and the alternating-current resistance of the high-frequency transmission line 2 becomes high.

On the other hand, in the embodiment, the carbon nanotube is unevenly distributed at the peripheral part 8, and the carbon nanotube suppresses the oxidization of the metal located at the vicinity of the surface of the high-frequency transmission line 2. Therefore, in the embodiment, the electric conductivity at the vicinity of the surface of the high-frequency transmission line 2 is hard to decrease, and even when the skin effect occurs, the alternating-current resistance of the high-frequency transmission line 2 is hard to increase. Even if the metal located at the vicinity of the surface of the high-frequency transmission line 2 is oxidized, since the carbon nanotube unevenly distributed at the peripheral part 8 itself has electric conductivity, the electric conductivity at the vicinity of the surface of the high-frequency transmission line 2 is hard to decrease, and the alternating-current resistance of the high-frequency transmission line 2 is hard to increase. In a high-frequency band in which the skin effect is conspicuous, the alternating-current resistance of the high-frequency transmission line 2 according to the embodiment sometimes falls below the alternating-current resistance of the high-frequency transmission line composed of the metal simple substance.

The electric conductivity of the carbon nanotube is lower than the electric conductivity of the metal simple substance (unoxidized metal). Therefore, if the carbon nanotube is not unevenly distributed at the peripheral part 8 and evenly disperses over the whole of the high-frequency transmission line 2, the carbon nanotube impairs the electric conductivity at the central part 6 and increases the alternating-current resistance in the whole of the high-frequency transmission line 2. On the other hand, in the embodiment, since the carbon nanotube is unevenly distributed at the peripheral part 8, it is hard for the carbon nanotube to impair the electric conductivity at the central part 6. Therefore, in the embodiment, the alternating-current resistance in the whole of the high-frequency transmission line 2 is easily reduced, compared to the case where the carbon nanotube evenly disperses over the whole of the high-frequency transmission line 2.

In the case where the high-frequency transmission line 2 according to the embodiment is an antenna, the radiation efficiency and absorption efficiency of the antenna according to the embodiment improve compared to the case where the carbon nanotube evenly disperses over the whole of the antenna. Here, the radiation efficiency, for example, is defined as the ratio of the total electric power that the antenna radiates, relative to the total electric power that is supplied to the antenna. The absorption efficiency, for example, is defined as the ratio of the total electric power that the antenna absorbs, relative to the total electric power with which the antenna is irradiated.

The content rate of the carbon nanotube at the peripheral part 8 may be, for example, 0.5 to 20% by volume, relative to the total volume of the peripheral part 8. In the case where the content rate of the carbon nanotube is 0.5% by volume or more, the oxidization of the metal at the vicinity of the surface of the high-frequency transmission line 2 is easily suppressed. In the case where the content rate of the carbon nanotube is 20% by volume or less, the increase in the alternating-current resistance in the whole of the high-frequency transmission line 2 that is caused by the relatively low electric conductivity of the carbon nanotube itself is easily suppressed. The peripheral part 8 may contain the above metal, in addition to the carbon nanotube. The content rate of the metal at the peripheral part 8 may be, for example, 80 to 95.5% by volume, relative to the total volume of the peripheral part 8. In the case where the content rate of the metal is 80% by volume or more, the alternating-current resistance in the whole of the high-frequency transmission line 2 is easily reduced due to the relatively high electric conductivity of the metal itself at the peripheral part 8. The peripheral part 8 may be composed of only the carbon nanotube.

The content rate of the carbon nanotube at the peripheral part 8 may be measured by the following method, for example. First, the cross-section of the high-frequency transmission line 2 in the direction perpendicular to the transmission direction of the alternating-current electric signal is observed with a scanning electron microscope. The cross-section area of the each carbon nanotube exposed on the peripheral part 8 of this cross-section is measured, and the total value of the cross-section areas of the carbon nanotubes is determined. Further, the area of the whole of the peripheral part 8 exposed on the above cross-section is measured. The content rate of the carbon nanotube at the peripheral part 8 is calculated, by multiplying, by 100, the value resulting from dividing the total value of the cross-section areas of the carbon nanotubes by the value of the area of the whole of the peripheral part 8. That is, the content rate of the carbon nanotube at the peripheral part 8 is equal to the proportion (percentage) of the cross-section area of the carbon nanotube to the whole of the peripheral part 8 exposed on the above cross-section. Here, the content rate of the carbon nanotube at the central part 6 is equal to the proportion (percentage) of the cross-section area of the carbon nanotube to the whole of the central part 6 exposed on the above cross-section.

The thickness d of the peripheral part 8 (the depth of the peripheral part) may be 0.1 to 0.5 µm. In the case where the thickness d of the peripheral part 8 is 0.1 µm or more, the oxidization of the metal is easily suppressed by the carbon nanotube. In the case where the thickness d of the peripheral part 8 is 0.5 µm or less, the increase in the alternating-current resistance in the whole of the high-frequency transmission line 2 due to the relatively low electric conductivity of the carbon nanotube itself is easily suppressed.

At an exposed part in the high-frequency transmission line 2, the metal is easily oxidized. On the other hand, at an unexposed part in the high-frequency transmission line 2 (a part adhering closely to the substrate 4), the metal is hard to be oxidized, and the need to suppress the oxidization of the metal by the carbon nanotube is low. Therefore, as shown in FIG. 2A, the peripheral part 8 at which the carbon nanotube is unevenly distributed may be located only at the exposed part in the high-frequency transmission line 2. That is, the peripheral part 8 at which the carbon nanotube is unevenly distributed does not need to be located at the unexposed part in the high-frequency transmission line 2 (the part adhering closely to the substrate 4). However, as shown in FIG. 2B, the peripheral part 8 at which the carbon nanotube is unevenly distributed may be located at the unexposed part in the high-frequency transmission line 2 (the part adhering closely to the substrate 4). The metal located at the central part 6, originally, is hard to be oxidized, and therefore, the carbon nanotube does not need to be present at the central part 6.

Since the electric conductivity of the carbon nanotube is lower than the electric conductivity of the metal simple substance (unoxidized metal), the lower the content rate of the carbon nanotube at the central part 6 is, the more easily the alternating-current resistance in the whole of the high-frequency transmission line 2 is reduced. In other words, the higher the content rate (volume rate) of the metal at the central part 6 is, the more easily the alternating-current resistance in the whole of the high-frequency transmission line 2 is reduced. Therefore, it is preferable that the main component of the central part 6 be the above metal. Further, the greater the area of the central part 6 containing the metal as the main component is relative to the area of the peripheral part 8, the more easily the alternating-current resistance in the whole of the high-frequency transmission line 2 is reduced. The content rate of the metal at the central part 6 may be more than 95% by volume and 100% by volume or less, or may be 99% by volume or more and 100% by volume or less, relative to the total volume of the central part 6. The central part 6 may be composed of only the above metal. However, a slight amount of carbon nanotube that does not impair the electric conductivity at the central part 6 may be contained in the central part 6.

The substrate 4, for example, may be a semiconductor substrate, or may be an insulating substrate. The substance composing the substrate 4 may be semiconductors such as silicon, gallium arsenide, silicon carbide and gallium nitride, epoxy resin-impregnated glass fibers, dielectric resins such as polycarbonate resin, ABS resin and acrylic resin, or dielectric inorganic compounds such as glass ceramics. The thickness of the substrate 4 is not particularly limited, and for example, may be 50 µm to 2 mm.

Next, a production method for the high-frequency transmission line 2 according to the embodiment will be described below. The following production method is a production method for the high-frequency transmission line 2 having the cross-section shown in FIG. 2A.

Figure 3A:
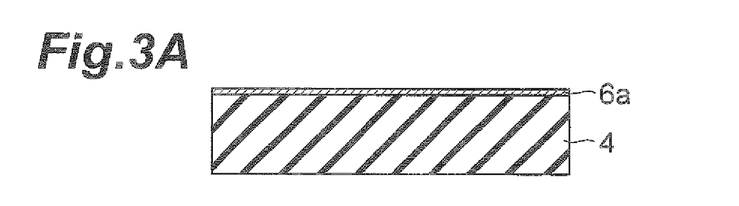
FIG. 3A, FIG. 3B, FIG. 3C and FIG. 3D are schematic views showing a production method for a high-frequency transmission line according to an embodiment of the present invention.

As shown in FIG. 3A, a seed layer 6a is formed on the surface of the substrate 4. For example, in the case where the metal contained in the high-frequency transmission line 2 is copper, the seed layer 6a composed of copper and chromium is formed. The seed layer 6a configures a part of the central part 6 of the high-frequency transmission line 2. The seed layer 6a may be formed by sputtering, for example.

Figure 3B:
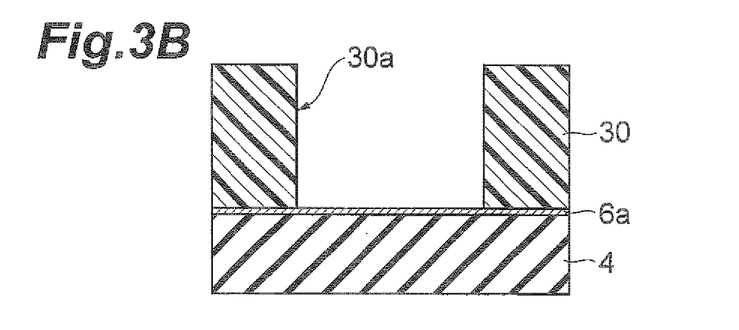

Subsequently, as shown in FIG. 3B, a photoresist 30 is applied to the surface of the seed layer 6a. Subsequently, the exposure and development of the photoresist is performed, and a concave part 30a in a meander pattern surrounded by the photoresist 30 is formed.

Figure 3C:
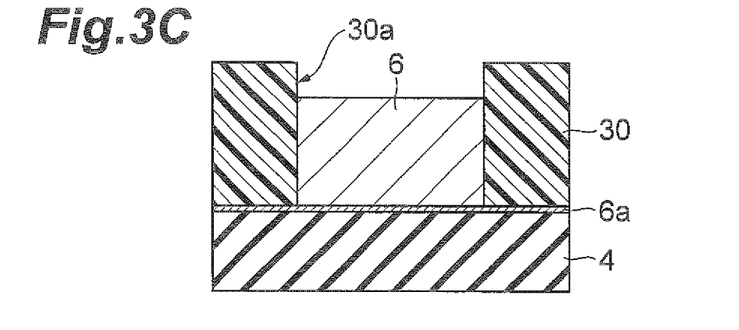

Subsequently, as shown in FIG. 3C, the central part 6 in the meander pattern is formed in the concave part 30a. The main component of the central part 6 is the metal. The central part 6 may be composed of only the metal. The formation method for the central part 6 may be appropriately selected depending on the kind of the metal composing the central part 6. The formation method for the central part 6 may be, for example, a plating, a sputtering or a chemical vapor deposition (CVD). The plating may be an electroplating or an electroless plating.

Figure 3D:
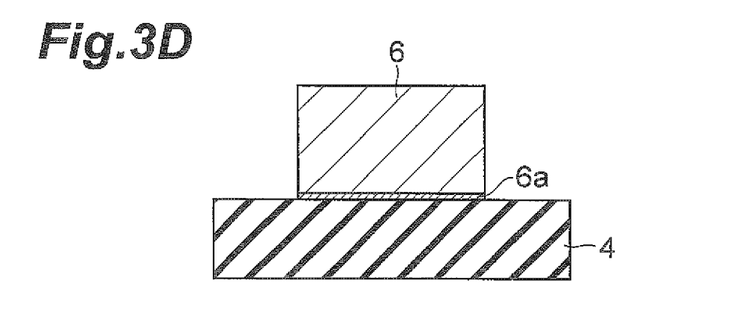

Subsequently, as shown in FIG. 3D, the photoresist 30 and the seed layer 6a remaining on the surface of the substrate 4 are removed from the surface of the substrate 4. The electroless plating is performed using a plating solution neat contains the metal and the carbon nanotube. By the electroless plating, the peripheral part 8 composed of a plating film that contains the metal and the carbon nanotube is formed on the surface of the central part 6. By the content of the carbon nanotube in the plating solution, it is possible to control the content rate of the carbon nanotube at the peripheral part 8. By the concentration of the plating solution or the execution time of the plating, it is possible to control the thickness of the peripheral part 8. The plating solution may contain a dispersing agent for dispersing the carbon nanotube. The dispersing agent may be, for example, polystyrene sulfonates, polyvinylpyrrolidone copolymers, water-soluble cellulose, or water-soluble cellulose derivatives.

By the above processes, the electronic circuit board 16 comprising the substrate 4 and the high-frequency transmission line 2 provided along the surface of the substrate 4 is completed. Here, depending on the formation method for the central part 6 and the peripheral part 8, it is not always necessary to form the seed layer 6a.

So far, an embodiment of the present invention has been described, but the present invention is not limited to the above embodiment at all.

For example, in the case of producing the high-frequency transmission line 2 having the cross-section shown in FIG. 2B, the peripheral part 8 composed of the plating film that contains the metal and the carbon nanotube is formed on the surface of the seed layer 6a in the concave part 30a, after the concave part 30a in the meander pattern is formed. Subsequently, the central part 6 is formed on the surface of the peripheral part 8. Subsequently, the photoresist 30 and the remaining seed layer 6a are removed from the surface of the substrate 4. Subsequently, the peripheral part 8 composed of the plating film that contains the metal and the carbon nanotube is formed on the surface of the central part 6. By these processes, the high-frequency transmission line 2 having the cross-section shown in FIG. 2B is obtained. In this case, the seed layer 6a configures a part of the peripheral part 8 of the high-frequency transmission line 2.

The formation method for the central part 6 is not limited to the above method. For example, a photoresist is applied to a glass epoxy substrate on which a metal foil (for example, copper) is laminated. Then, the exposure, the development, the etching of the metal and the removal of the resist are performed. By a series of these processes, the central part 6 in the meander pattern that is composed of the metal may be formed along the surface of the substrate 4. Alternatively, the central part 6 in the meander pattern may be transferred or printed on the surface of the substrate 4.

The formation method for the peripheral part 8 is not limited to the above method. For example, a catalyst component such as gold, silver, copper, iron, cobalt, nickel or tin is attached to the surface of the central part 6 in the meander pattern. Subsequently, hydrocarbon gas such as methane or acetylene is decomposed by heat, and the carbon nanotube is grown on the catalyst component. Subsequently, by plating, sputtering or CVD, the metal component is filled into gaps among the carbon nanotubes. By these processes, the peripheral part 8 containing the metal and the carbon nanotube may be formed.

A dispersing liquid containing the carbon nanotube may be applied to the surface of the central part 6, and the carbon nanotube in the dispersing liquid may be physically absorbed on the surface of the central part 6. Subsequently, by plating, sputtering or CVD, the metal component is filled into the gaps among the carbon nanotubes. By these processes, the peripheral part 8 containing the metal and the carbon nanotube may be formed.

Figure 4:
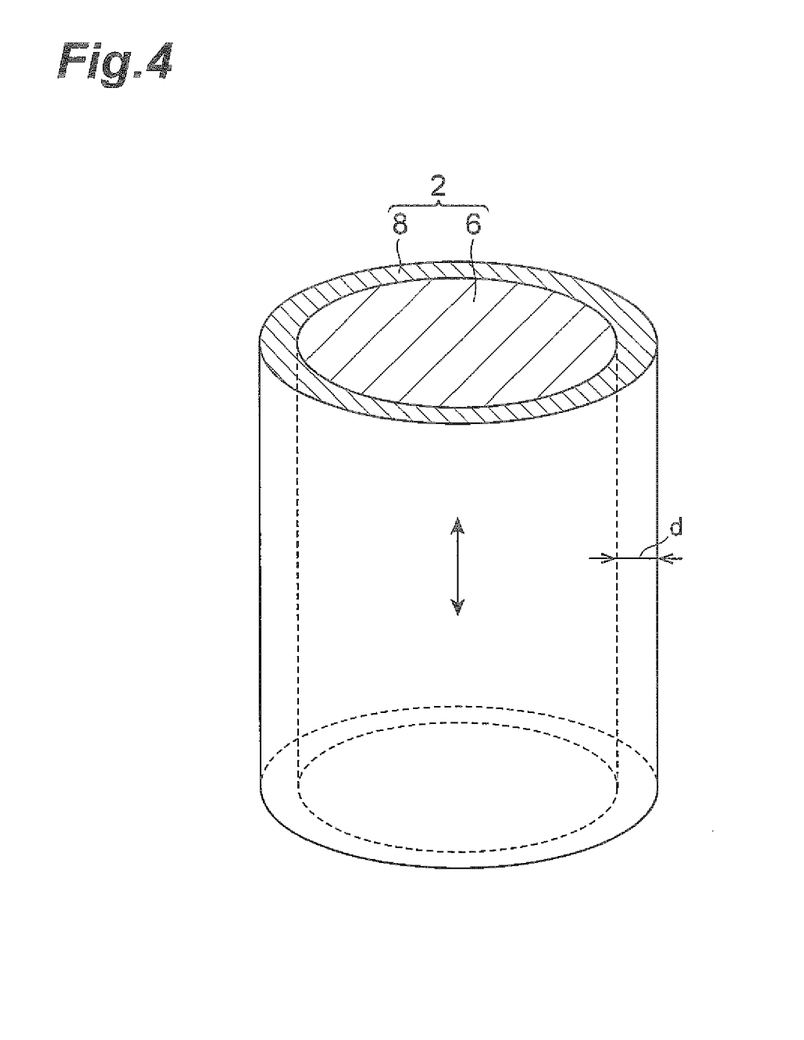
FIG. 4 is a schematic perspective view of a high-frequency transmission line according to another embodiment of the present invention.

As shown in FIG. 4, the high-frequency transmission line 2 may have a cylindrical shape. That is, the high-frequency transmission line 2 may comprise a cylindrical central part 6 and a cylindrical peripheral part 8 covering the lateral surface of the central part 6. Such a cylindrical high-frequency transmission line 2 may be formed in a through hole or a via hole on an electronic circuit board. The high-frequency transmission line may have a prismatic shape.

Also in a transistor, an IC, a condenser, an inductor, a filter, an electromagnetic shield and the like that comprise the above high-frequency transmission line, the same effect as the above embodiment are achieved.

EXAMPLES

Hereinafter, the content of the present invention will be described in more detail, using examples and comparative examples, but the present invention is not limited to the following examples.

Example 1

A silicon substrate having a thermal oxide film formed on the surface was prepared. The dimensions of the silicon substrate were 30 mm in width×30 mm in length×0.625 in thickness.

By sputtering, a seed layer composed of chromium and copper was formed on the surface of the silicon substrate having thermal oxide film formed.

A photoresist was applied to the surface of the seed layer. Subsequently, the exposure and development of the photoresist was performed, and a concave part in a meander pattern was formed.

An electroplating was performed using an electroplating solution containing copper and not containing carbon nanotube. By this electroplating, a central part in the meander pattern that was composed of copper was formed in the concave part. This central part was substantially composed of only copper. The thickness of the central part was uniform.

Subsequently, the photoresist and the remaining seed layer were removed from the surface of the silicon substrate. An electroless plating was performed using an electroless plating solution containing copper and carbon nanotube. By this electroless plating, a peripheral part composed of a plating film containing copper and carbon nanotube was formed on the surface of the central part. The thickness of the peripheral part was uniform. The content rate of the carbon nanotube in the electroless plating solution used for the formation of the peripheral part was regulated so as to be 0.05 g/L.

Through the above processes, a high-frequency transmission line in a meander pattern provided along the surface of the silicon substrate was made. The transmission direction of the alternating-current electric signal on the high-frequency transmission line was the direction parallel to the surface of the silicon substrate. The width of the high-frequency transmission line in the direction parallel to the surface of the silicon substrate was uniform, and was 100 µm. The thickness of the high-frequency transmission line in the direction perpendicular to the surface of the silicon substrate was uniform, and was 10 µm. The line length of the whole of the high-frequency transmission line was 19.7 mm. A cross-section of the high-frequency transmission line in the direction perpendicular to the surface of the silicon substrate (to the transmission direction of the alternating-current electric signal) was observed with a scanning electron microscope. It was confirmed that this cross-section consisted of the rectangular central part 6 and the peripheral part 8 surrounding the three sides of the central part 6 as shown in FIG. 2A. The thickness of the peripheral part 8 was uniform. The thickness of the peripheral part 8 was 0.5 µm. The content rate of the carbon nanotube at the peripheral part 8 was 0.5% by volume, relative to the total volume of the peripheral part 8. The content rate of the carbon nanotube at the central part 6 was 0% by volume, relative to the total volume of the central part 6. That is, the carbon nanotube was unevenly distributed at the peripheral part 8.

Examples 2 to 5

In Examples 2 to 5, the content rate of the carbon nanotube in the electroless plating solution to be used for the formation of the peripheral part was regulated, and the content rate of the carbon nanotube at the peripheral part was controlled to the values shown in Table 1. By the same method as Example 1 except for this point, each high-frequency transmission line in Examples 2 to 5 was made. Except for the content rate of the carbon nanotube at the peripheral part, the dimensions, shape, cross-section configuration and composition of each high-frequency transmission line in Examples 2 to 5 were the same as the high-frequency transmission line in Example 1. Here, the content rate of the carbon nanotube in the electroless plating solution used for the formation of the peripheral part in Example 2 was 0.1 g/L. The content rate of the carbon nanotube in the electroless plating solution used for the formation of the peripheral part in Example 3 was 0.5 g/L. The content rate of the carbon nanotube in the electroless plating solution used for the formation of the peripheral part in Example 4 was 1.0 g/L. The content rate of the carbon nanotube in the electroless plating solution used for the formation of the peripheral part in Example 5 was 2.0 g/L. The "CNT" shown in Table 1 means the carbon nanotube.

Comparative Example 1

In Comparative Example 1, the central part was formed from the electroless plating solution used for the formation of the peripheral part in Example 1. That is, in Comparative Example 1, the central part was formed by not the electroplating but the electroless plating. Further, in Comparative Example 1, by the same method as Example 1, the peripheral part was formed. By the same method as Example 1 except for these points, a high-frequency transmission line in Comparative Example 1 was made. It was confirmed that the content rate of the carbon nanotube at the peripheral part in Comparative Example 1 was the same as the content rate of the carbon nanotube at the peripheral part in Example 1. It was confirmed that the content rate of the carbon nanotube at the central part in Comparative Example 1 was the same as the content rate of the carbon nanotube at the peripheral part in Example 1. That is, it was confirmed that the content rate of the carbon nanotube at the peripheral part in Comparative Example 1 was the same as the content rate of the carbon nanotube at the central part in Comparative Example 1. In other words, it was confirmed that the carbon nanotube was evenly distributed over the whole of the high-frequency transmission line in Comparative Example 1. The dimensions and shape of the high-frequency transmission line in Comparative Example 1 were the same as the high-frequency transmission line in Example 1.

Comparative Example 2

In Comparative Example 2, the central part was formed from the electroless plating solution used for the formation of the peripheral part in Example 2. That is, in Comparative Example 2, the central part was formed by not the electroplating but the electroless plating. Further, in Comparative Example 2, by the same method as Example 2, the peripheral part was formed. By the same method as Example 2 except for these points, a high-frequency transmission line in Comparative Example 2 was made. It was confirmed that the content rate of the carbon nanotube at the peripheral part in Comparative Example 2 was the same as the content rate of the carbon nanotube at the peripheral part in Example 2. It was confirmed that the content rate of the carbon nanotube at the central part in Comparative Example 2 was the same as the content rate of the carbon nanotube at the peripheral part in Example 2. That is, it was confirmed that the content rate of the carbon nanotube at the peripheral part in Comparative Example 2 was the same as the content rate of the carbon nanotube at the central part in Comparative Example 2. In other words, it was confirmed that the carbon nanotube was evenly distributed over the whole of the high-frequency transmission line in Comparative Example 2. The dimensions and shape of the high-frequency transmission line in Comparative Example 2 were the same as the high-frequency transmission line in Example 2.

Comparative Example 3

In Comparative Example 3, the central part was formed from the electroless plating solution used for the formation of the peripheral part in Example 3. That is, in Comparative Example 3, the central part was formed by not the electroplating but the electroless plating. Further, in Comparative Example 3, by the same method as Example 3, the peripheral part was formed. By the same method as Example 3 except for these points, a high-frequency transmission line in Comparative Example 3 was made. It was confirmed that the content rate of the carbon nanotube at the peripheral part in Comparative Example 3 was the same as the content rate of the carbon nanotube at the peripheral part in Example 3. It was confirmed that the content rate of the carbon nanotube at the central part in Comparative Example 3 was the same as the content rate of the carbon nanotube at the peripheral part in Example 3. That is, it was confirmed that the content rate of the carbon nanotube at the peripheral part in Comparative Example 3 was the same as the content rate of the carbon nanotube at the central part in Comparative Example 3. In other words, it was confirmed that the carbon nanotube was evenly distributed over the whole of the high-frequency transmission line in Comparative Example 3. The dimensions and shape of the high-frequency transmission line in Comparative Example 3 were the same as the high-frequency transmission line in Example 3.

Comparative Example 4

In Comparative Example 4, the central part was formed from the electroless plating solution used for the formation of the peripheral part in Example 4. That is, in Comparative Example 4, the central part was formed by not the electroplating but the electroless plating. Further, in Comparative Example 4, by the same method as Example 4, the peripheral part was formed. By the same method as Example 4 except for these points, a high-frequency transmission line in Comparative Example 4 was made. It was confirmed that the content rate of the carbon nanotube at the peripheral part in Comparative Example 4 was the same as the content rate of the carbon nanotube at the peripheral part in Example 4. It was confirmed that the content rate of the carbon nanotube at the central part in Comparative Example 4 was the same as the content rate of the carbon nanotube at the peripheral part in Example 4. That is, it was confirmed that the content rate of the carbon nanotube at the peripheral part in Comparative Example 4 was the same as the content rate of the carbon nanotube at the central part in Comparative Example 4. In other words, it was confirmed that the carbon nanotube was evenly distributed over the whole of the high-frequency transmission line in Comparative Example 4. The dimensions and shape of the high-frequency transmission line in Comparative Example 4 were the same as the high-frequency transmission line in Example 4.

Comparative Example 5

In Comparative Example 5, the central part was formed from the electroless plating solution used for the formation of the peripheral part in Example 5. That is, in Comparative Example 5, the central part was formed by not the electroplating but the electroless plating. Further, in Comparative Example 5, by the same method as Example 5, the peripheral part was formed. By the same method as Example 5 except for these points, a high-frequency transmission line in Comparative Example 5 was made. It was confirmed that the content rate of the carbon nanotube at the peripheral part in Comparative Example 5 was the same as the content rate of the carbon nanotube at the peripheral part in Example 5. It was confirmed that the content rate of the carbon nanotube at the central part in Comparative Example 5 was the same as the content rate of the carbon nanotube at the peripheral part in Example 5. That is, it was confirmed that the content rate of the carbon nanotube at the peripheral part in Comparative Example 5 was the same as the content rate of the carbon nanotube at the central part in Comparative Example 5. In other words, it was confirmed that the carbon nanotube was evenly distributed over the whole of the high-frequency transmission line in Comparative Example 5. The dimensions and shape of the high-frequency transmission line in Comparative Example 5 were the same as the high-frequency transmission line in Example 5.

Reference Example 1

In Reference Example 1, the peripheral part was formed from an electroless plating solution containing copper and not containing carbon nanotube. By the same method as Example 1 except for this point, the high-frequency transmission line in Reference Example 1 was made. The high-frequency transmission line in Reference Example 1 was substantially composed of only copper. That is, the high-frequency transmission line in Reference Example 1 did not contain carbon nanotube. The dimensions and shape of the high-frequency transmission line in Reference Example 1 were the same as the high-frequency transmission line in Example 1.

<Measurement of Alternating-Current Resistance>

Alternating-current electric signals whose frequencies F [GHz] are the values shown in Table 1 were applied to the high-frequency transmission line in Example 1, and the alternating-current resistance R(F) [Ω] of the high-frequency transmission line for each frequency F [GHz] was measured with an impedance analyzer. The alternating-current resistance R(F) is the resistance between one end and the other end of the high-frequency transmission line (meander pattern). By the same method, the alternating-current resistance Rcu(F) [Ω] of the high-frequency transmission line in Reference Example 1 for each frequency F [GHz] was measured. Then, the ratio r(F) of the R(F) to the Rcu(F) for each frequency F [GHz] was determined. The r(F) is expressed by Expression A. The r(F) in Example 1 for each frequency F is shown in Table 1. Here, the electric signal whose frequency F is 0 means a direct-current electric signal. Therefore, R(0) is the direct-current resistance of the high-frequency transmission line in Example 1, and Rcu(0) is the direct-current resistance of the high-frequency transmission line in Reference Example 1.

$$r(F)=R(F)/Rcu(F) \qquad (A)$$

The r(F) in Reference Example 1 shown in Table 1 is defined as Rcu(F)/Rcu(F). Therefore, each r(F) in Reference Example 1 shown in Table 1 is 1.00.

Similarly to Example 1, each r(F) in Examples 2 to 5 and Comparative Examples 1 to 5 was determined. Each r(F) in Examples 2 to 5 and Comparative Examples 1 to 5 is shown in Table 1.

TABLE 1

| | Content rate of CNT (% by volume) | | r(F) = R(F)/Rcu(F) | | | | | | | |
|---|---|---|---|---|---|---|---|---|---|---|
| | Central part | Peripheral part | F = 0 [GHz] | F = 0.20 [GHz] | F = 0.50 [GHz] | F = 0.75 [GHz] | F = 1.00 [GHz] | F = 1.25 [GHz] | F = 1.50 [GHz] | F = 2.00 [GHz] |
| Example 1 | 0 | 0.5 | 1.00 | 1.00 | 1.00 | 1.00 | 0.99 | 0.97 | 0.95 | 0.91 |
| Comparative Example 1 | 0.5 | 0.5 | 1.02 | 1.02 | 1.02 | 1.02 | 1.01 | 1.01 | 1.00 | 1.00 |
| Example 2 | 0 | 2 | 1.00 | 1.00 | 1.00 | 0.99 | 0.98 | 0.95 | 0.91 | 0.86 |
| Comparative Example 2 | 2 | 2 | 1.05 | 1.05 | 1.04 | 1.04 | 1.03 | 1.02 | 1.02 | 1.02 |
| Example 3 | 0 | 8 | 1.01 | 1.00 | 1.00 | 0.99 | 0.97 | 0.94 | 0.90 | 0.84 |
| Comparative Example 3 | 8 | 8 | 1.16 | 1.16 | 1.15 | 1.15 | 1.13 | 1.10 | 1.09 | 1.08 |
| Example 4 | 0 | 15 | 1.01 | 1.01 | 1.00 | 0.98 | 0.95 | 0.91 | 0.87 | 0.82 |
| Comparative Example 4 | 15 | 15 | 1.31 | 1.31 | 1.30 | 1.29 | 1.28 | 1.25 | 1.22 | 1.20 |
| Example 5 | 0 | 20 | 1.02 | 1.02 | 1.01 | 1.00 | 0.95 | 0.89 | 0.85 | 0.79 |
| Comparative Example 5 | 20 | 20 | 1.44 | 1.44 | 1.43 | 1.41 | 1.39 | 1.34 | 1.31 | 1.27 |
| Reference Example 1 | 0 | 0 | 1.00 | 1.00 | 1.00 | 1.00 | 1.00 | 1.00 | 1.00 | 1.00 |

Comparison of Example 1, Comparative Example 1 and Reference Example 1

Example 1 and Comparative Example 1, in which the content rates of the carbon nanotubes at the peripheral parts were the same, were compared. It was confirmed that the r(F) in Example 1 was less than the r(F) in Comparative Example 1 for all frequencies F [GHz]. That is, it was confirmed that the alternating-current resistance R(F) in Example 1 was lower than the alternating-current resistance R(F) in Comparative Example 1 for all frequencies F [GHz]. The inventors presume that the low alternating-current resistance R(F) in Example 1 is due to the following factors 1 and 2.

<Factor 1> The carbon nanotube unevenly distributed at the peripheral part in Example 1 suppresses the oxidization of copper and the decrease in electric conductivity at the vicinity of the surface of the high-frequency transmission line. Even if the copper is oxidized, the decrease in the electric conductivity at the vicinity of the surface of the high-frequency transmission line is suppressed by the electric conductivity of the carbon nanotube itself. Therefore, even when the alternating-current electric signal concentrates at the vicinity of the surface of the high-frequency transmission line by the skin effect in the high-frequency band, the transmission of the alternating-current electric signal at the vicinity of the surface of the high-frequency transmission line is hard to be obstructed.

<Factor 2> The central part in Example 1 is substantially composed of only copper, while the central part in Comparative Example 1 contains not only copper but also the carbon nanotube, whose electric conductivity is lower than copper. That is, in Comparative Example 1, the carbon nanotube, whose electric conductivity is lower than copper, is distributed over the whole of the high-frequency transmission line. Therefore, the electric conductivity in the whole of the high-frequency transmission line in Example 1 is higher than the electric conductivity in the whole of the high-frequency transmission line in Comparative Example 1.

Example 1 and Reference Example 1 were compared. It was confirmed that the r(F) in Example 1 was less than 1.00 in the case where the frequency F [GHz] was 1.00 [GHz] or higher. That is, it was confirmed that the alternating-current resistance R(F) in Example 1 was lower than the alternating-current resistance Rcu(F) in Reference Example 1 in the case where the frequency F [GHz] was a certain threshold value or higher.

It was confirmed that the r(F) in Example 1 decreased with the increase in the frequency F [GHz] in the case where the frequency F [GHz] was 1.00 [GHz] or higher. That is, it was confirmed that the higher the frequency F [GHz] was, the more easily the increase in the alternating-current resistance R(F) in Example 1 was suppressed relative to the increase in the alternating-current resistance Rcu(F) in Reference Example 1.

The inventors presume that the above relation of Example 1 and Reference Example 1 in the high-frequency band is due to the following factors 3 and 4.

<Factor 3> In Example 1, the carbon nanotube unevenly distributed at the peripheral part suppresses the oxidization of copper and the decrease in electric conductivity at the vicinity of the surface of the high-frequency transmission line. Even if the copper is oxidized, the decrease in the electric conductivity at the vicinity of the surface of the high-frequency transmission line is suppressed by the electric conductivity of the carbon nanotube itself. On the other hand, at the peripheral part of the high-frequency transmission line in Reference Example 1, the carbon nanotube is not present. Therefore, the copper at the vicinity of the surface of the high-frequency transmission line in Reference Example 1 is easily oxidized compared to Example 1, and the electric conductivity at the vicinity of the surface of the high-frequency transmission line in Reference Example 1 easily decreases compared to Example 1.

<Factor 4> In both of Example 1 and Reference Example 1, the higher the frequency F [GHz] is, the more easily the alternating-current electric signal concentrates at the vicinity of the surface of the high-frequency transmission line by the skin effect. Therefore, in both of Example 1 and Reference Example 1, the higher the frequency F [GHz] is, the more easily the electric conductivity at the vicinity of the surface of the high-frequency transmission line influences the alternating-current resistance in the whole of the high-frequency transmission line. That is, the higher the frequency F [GHz] is, the more easily the alternating-current resistance in the whole of the high-frequency transmission line increases, due to the decrease in the electric conductivity at the vicinity of the surface of the high-frequency transmission line. As described above, the electric conductivity at the vicinity of the surface of the high-frequency transmission line in Reference Example 1 easily decreases compared to Example 1. Therefore, the higher the frequency F [GHz] is, the more easily the alternating-current resistance in the whole of the high-frequency transmission line in Reference Example 1 increases compared to Example 1.

Comparative Example 1 and Reference Example 1 were compared. It was confirmed that the r(F) in Comparative Example 1 was 1.00 or more for all frequencies F [GHz]. That is, it was confirmed that the alternating-current resistance R(F) in Comparative Example 1 was equal to or higher than the alternating-current resistance Rcu(F) in Reference Example 1 for all frequencies F [GHz]. This is because the high-frequency transmission line in Reference Example 1 is substantially composed of only copper, while, in Comparative Example 1, the carbon nanotube, whose electric conductivity is lower than copper, is distributed over the whole of the high-frequency transmission line.

It was confirmed that the r(F) in Comparative Example 1 decreased and got close to 1.00 with the increase in the frequency F [GHz]. In other words, the alternating-current resistance Rcu(F) in Reference Example 1 tended to get close to the alternating-current resistance R(F) in Comparative Example 1, with the increase in the frequency F [GHz]. The inventors presume that this is due to the following factors 5 and 6.

<Factor 5> The carbon nanotube located at the peripheral part of the high-frequency transmission line in Comparative Example 1 suppresses the oxidization of copper and the decrease in electric conductivity at the vicinity of the surface of the high-frequency transmission line. Even if the copper is oxidized, the decrease in the electric conductivity at the vicinity of the surface of the high-frequency transmission line is suppressed by the electric conductivity of the carbon nanotube itself. On the other hand, at the peripheral part of the high-frequency transmission line in Reference Example 1, the carbon nanotube is not present. Therefore, the copper at the vicinity of the surface of the high-frequency transmission line in Reference Example 1 is easily oxidized compared to Comparative Example 1, and the electric conductivity at the vicinity of the surface of the high-frequency transmission line in Reference Example 1 easily decreases compared to Comparative Example 1.

<Factor 6> In both of Comparative Example 1 and Reference Example 1, the higher the frequency F [GHz] is, the more easily the alternating-current electric signal concentrates at the vicinity of the surface of the high-frequency transmission line by the skin effect. Therefore, in both of Comparative Example 1 and Reference Example 1, the higher the frequency F [GHz] is, the more easily the electric conductivity at the vicinity of the surface of the high-frequency transmission line influences the alternating-current resistance in the whole of the high-frequency transmission line. That is, the higher the frequency F [GHz] is, the more easily the alternating-current resistance in the whole of the high-frequency transmission line increases, due to the decrease in the electric conductivity at the vicinity of the surface of the high-frequency transmission line. As described above, the electric conductivity at the vicinity of the surface of the high-frequency transmission line in Reference Example 1 easily decreases compared to Comparative Example 1. Therefore, the higher the frequency F [GHz] is, the more easily the alternating-current resistance in the whole of the high-frequency transmission line in Reference Example 1 increases compared to Comparative Example 1. However, the high-frequency transmission line in Reference Example 1 is substantially composed of only copper, while, in Comparative Example 1, the carbon nanotube, whose electric conductivity is lower than copper, is distributed over the whole of the high-frequency transmission line, and therefore, the alternating-current resistance in Reference Example 1 does not exceed the alternating-current resistance in Comparative Example 1.

Figure 5:
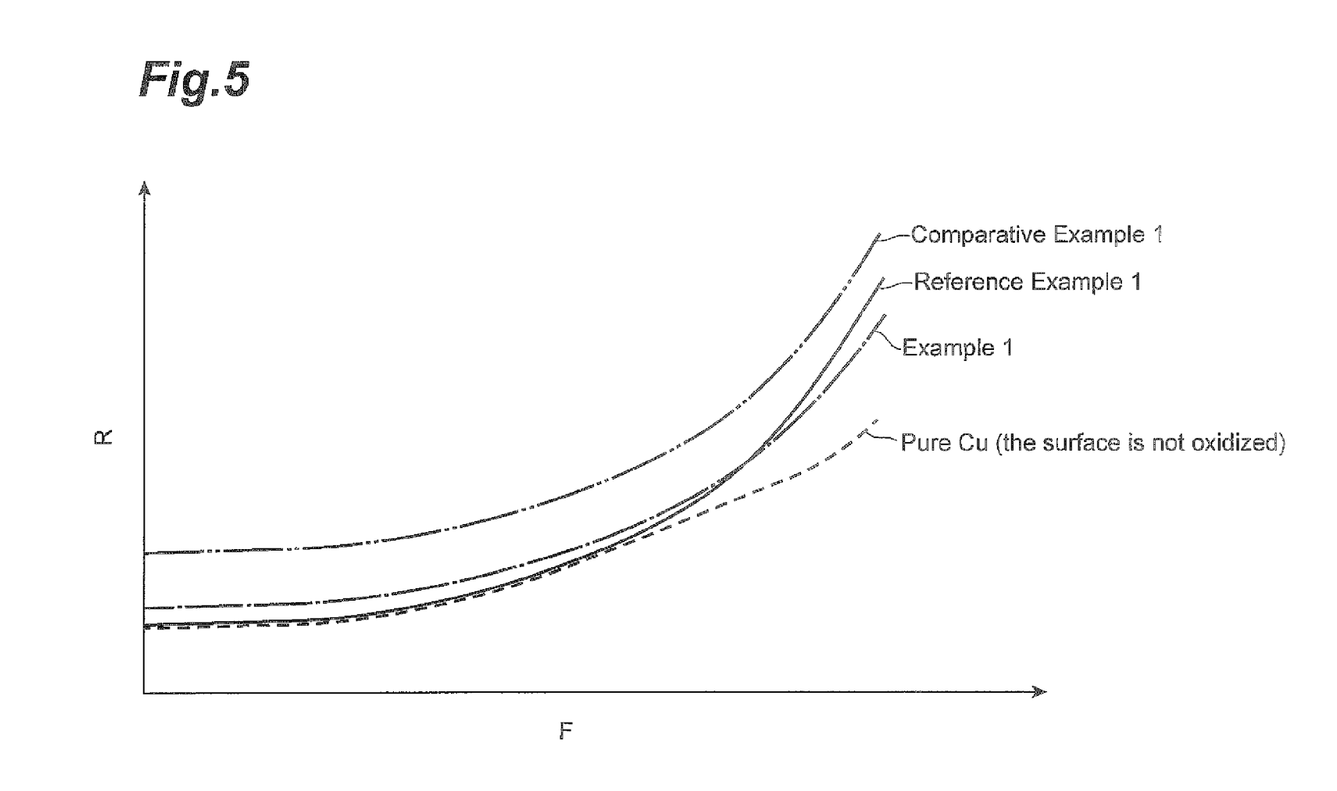
FIG. 5 is a graph showing the relation between the frequencies F of alternating-current electric signals to be transmitted by high-frequency transmission lines and the alternating-current resistances R of the high-frequency transmission lines for each frequency F.

The alternating-current resistance (R) for each frequency (F) in each of the above-described Example 1, Comparative Example 1 and Reference Example 1 is schematically shown in FIG. 5. Here, the curve of "Pure Cu" shown in FIG. 5 indicates the alternating-current resistance of a high-frequency transmission line composed of only an ideal copper that is not oxidized. That is, the alternating-current resistance of "Pure Cu" is not influenced by the oxidization of copper, and increases only by the skin effect.

Comparison of Example 2, Comparative Example 2 and Reference Example 1

Example 2 and Comparative Example 2, in which the content rates of the carbon nanotubes at the peripheral parts were the same, were compared. It was confirmed that the r(F) in Example 2 was less than the r(F) in Comparative Example 2 for all frequencies F [GHz]. That is, it was confirmed that the alternating-current resistance R(F) in Example 2 was lower than the alternating-current resistance R(F) in Comparative Example 2 for all frequencies F [GHz]. It was, confirmed that the r(F) in Example 2 was less than 1.00 in the case where the frequency F [GHz] was 0.75 [GHz] or higher. That is, it was confirmed that the alternating-current resistance R(F) in Example 2 was lower than the alternating-current resistance Rcu(F) in Reference Example 1 in the case where the frequency F [GHz] was a certain threshold value or higher. It was confirmed that the r(F) in Example 2 decreased with the increase in the frequency F [GHz] in the case where the frequency F [GHz] was 0.75 [GHz] or higher. That is, it was confirmed that the higher the frequency F [GHz] was, the more easily the increase in the alternating-current resistance R(F) in Example 2 was suppressed relative to the increase in the alternating-current resistance Rcu(F) in Reference Example 1. It was confirmed that the r(F) in Comparative Example 2 was more than 1.00 for all frequencies F [GHz]. That is, it was confirmed that the alternating-current resistance R(F) in Comparative Example 2 was higher than the alternating-current resistance Rcu(F) in Reference Example 1 for all frequencies F [GHz]. It was confirmed that the r(F) in Comparative Example 2 decreased and got close to 1.00 with the increase in the frequency F [GHz]. That is, the alternating-current resistance Rcu(F) in Reference Example 1 tended to get close to the alternating-current resistance R(F) in Comparative Example 2, with the increase in the frequency F [GHz].

Comparison of Example 3, Comparative Example 3 and Reference Example 1

Example 3 and Comparative Example 3, in which the content rates of the carbon nanotubes at the peripheral parts were the same, were compared. It was confirmed that the r(F) in Example 3 was less than the r(F) in Comparative Example 3 for all frequencies F [GHz]. That is, it was confirmed that the alternating-current resistance R(F) in Example 3 was lower than the alternating-current resistance R(F) in Comparative Example 3 for all frequencies F [GHz]. It was confirmed that the r(F) in Example 3 was less than 1.00 in the case where the frequency F [GHz] was 0.35 [GHz] or higher. That is, it was confirmed that the alternating-current resistance R(F) in Example 3 was lower than the alternating-current resistance Rcu(F) in Reference Example 1 in the case where the frequency F [GHz] was a certain threshold value or higher. It was confirmed that the r(F) in Example 3 decreased with the increase in the frequency F [GHz] in the case where the frequency F [GHz] was 0.35 [GHz] or higher. That is, it was confirmed that the higher the frequency F [GHz] was, the more easily the increase in the alternating-current resistance R(F) in Example 3 was suppressed relative to the increase in the alternating-current resistance Rcu(F) in Reference Example 1. It was confirmed that the r(F) in Comparative Example 3 was more than 1.00 for all frequencies F [GHz]. That is, it was confirmed that the alternating-current resistance R(F) in Comparative Example 3 was higher than the alternating-current resistance Rcu(F) in Reference Example 1 for all frequencies F [GHz]. It was confirmed that the r(F) in Comparative Example 3 decreased and got close to 1.00 with the increase in the frequency F [GHz]. That is, the alternating-current resistance Rcu(F) in Reference Example 1 tended to get close to the alternating-current resistance R(F) in Comparative Example 3, with the increase in the frequency F [GHz].

Comparison of Example 4, Comparative Example 4 and Reference Example 1

Example 4 and Comparative Example 4, in which the content rates of the carbon nanotubes at the peripheral parts were the same, were compared. It was confirmed that the r(F) in Example 4 was less than the r(F) in Comparative Example 4 for all frequencies F [GHz]. That is, it was confirmed that the alternating-current resistance R(F) in Example 4 was lower than the alternating-current resistance R(F) in Comparative Example 4 for all frequencies F [GHz]. It was confirmed that the r(F) in Example 4 was less than 1.00 in the case where the frequency F [GHz] was 0.35 [GHz] or higher. That is, it was confirmed that the alternating-current resistance R(F) in Example 4 was lower than the alternating-current resistance Rcu(F) in Reference Example 1 in the case where the frequency F [GHz] was a certain threshold value or higher. It was confirmed that the r(F) in Example 4 decreased with the increase in the frequency F [GHz] in the case where the frequency F [GHz] was 0.75 [GHz] or higher. That is, it was confirmed that the higher the frequency F [GHz] was, the more easily the increase in the alternating-current resistance R(F) in Example 4 was suppressed relative to the increase in the alternating-current resistance Rcu(F) in Reference Example 1. It was confirmed that the r(F) in Comparative Example 4 was more than 1.00 for all frequencies F [GHz]. That is, it was confirmed that the alternating-current resistance R(F) in Comparative Example 4 was higher than the alternating-current resistance Rcu(F) in Reference Example 1 for all frequencies F [GHz]. It was confirmed that the r(F) in Comparative Example 4 decreased and got close to 1.00 with the increase in the frequency F [GHz]. That is, the alternating-current resistance Rcu(F) in Reference Example 1 tended to get close to the alternating-current resistance R(F) in Comparative Example 4, with the increase in the frequency F Comparison of Example 5, Comparative Example 5 and Reference Example 1

Example 5 and Comparative Example 5, in which the content rates of the carbon nanotubes at the peripheral parts were the same, were compared. It was confirmed that the r(F) in Example 5 was less than the r(F) in Comparative Example 5 for all frequencies F [GHz]. That is, it was confirmed that the alternating-current resistance R(F) in Example 5 was lower than the alternating-current resistance R(F) in Comparative Example 5 for all frequencies F [GHz]. It was confirmed that the r(F) in Example 5 was less than 1.00 in the case where the frequency F [GHz] was 1.00 [GHz] or higher. That is, it was confirmed that the alternating-current resistance R(F) in Example 5 was lower than the alternating-current resistance Rcu(F) in Reference Example 1 in the case where the frequency F [GHz] was a certain threshold value or higher. It was confirmed that the r(F) in Example 5 decreased with the increase in the frequency F [GHz] in the case where the frequency F [GHz] was 1.00 [GHz] or higher. That is, it was confirmed that the higher the frequency F [GHz] was, the more easily the increase in the alternating-current resistance R(F) in Example 5 was suppressed relative to the increase in the alternating-current resistance Rcu(F) in Reference Example 1. It was confirmed that the r(F) in Comparative Example 5 was more than 1.00 for all frequencies F [GHz]. That is, it was confirmed that the alternating-current resistance R(F) in Comparative Example 5 was higher than the alternating-current resistance Rcu(F) in Reference Example 1 for all frequencies F [GHz]. It was confirmed that the r(F) in Comparative Example 5 decreased and got close to 1.00 with the increase in the frequency F [GHz]. That is, the alternating-current resistance Rcu(F) in Reference Example 1 tended to get close to the alternating-current resistance R(F) in Comparative Example 5, with the increase in the frequency F [GHz].

According to the present invention, a high-frequency transmission line in which the alternating-current resistance is low, and an antenna and an electronic circuit board that comprise the high-frequency transmission line are provided.

2 . . . high-frequency transmission line (or antenna), 4 . . . substrate, 6 . . . central part, 6*a* . . . seed layer, 8 . . . peripheral part, 10 . . . terminal, 16 . . . electronic circuit board, 30 . . . photoresist, 30*a* . . . concave part, d . . . thickness of a peripheral part.

What is claimed is:

1. A high-frequency transmission line to transmit an alternating-current electric signal, the high-frequency transmission line containing metal and carbon nanotube, the carbon nanotube being unevenly distributed at a peripheral part of a cross-section of the high-frequency transmission line, the cross-section being perpendicular to a transmission direction of the alternating-current electric signal, wherein a content rate of the carbon nanotube at the peripheral part is 0.5% to 20% by volume.

2. An antenna comprising the high-frequency transmission line according to claim 1.

3. An electronic circuit board comprising the high-frequency transmission line according to claim 1.

* * * * *